(12) United States Patent
Gross (10) Patent No.: US 6,192,490 B1
(45) Date of Patent: Feb. 20, 2001

(54) METHOD AND SYSTEM FOR MONITORING COMPUTER PERFORMANCE UTILIZING SOUND DIAGNOSTICS

(75) Inventor: Dave Gross, Oronoco, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/058,365

(22) Filed: Apr. 10, 1998

(51) Int. Cl.⁷ .................. H02H 3/05; H04B 1/74
(52) U.S. Cl. ............... 714/47; 702/38; 704/500; 704/503
(58) Field of Search .............. 714/47, 39; 702/38, 702/39, 54, 75, 171, 183, 185; 704/208, 214, 226, 500, 503

(56) References Cited

U.S. PATENT DOCUMENTS

| | | | |
|---|---|---|---|
| 3,845,572 | * 11/1974 | McCanney | 434/48 |
| 4,388,501 | * 6/1983 | Ahuja | 379/26 |
| 5,020,108 | * 5/1991 | Wason | 704/226 |
| 5,445,026 | * 8/1995 | Eagan | 73/591 |
| 5,541,516 | * 7/1996 | Rider et al. | 324/326 |
| 5,545,954 | * 8/1996 | Furukoshi | 318/116 |
| 5,566,092 | * 10/1996 | Wang et al. | 702/185 |
| 5,566,339 | * 10/1996 | Perholtz et al. | 713/340 |

\* cited by examiner

Primary Examiner—Dieu-Minh T. Le
(74) Attorney, Agent, or Firm—Felsman, Bradley, Vaden, Gunter & Dillon (57) ABSTRACT

A method and system for diagnosing data-processing system performance. Initially, unique audible sounds are associated with particular performance indicators within the data-processing system. Thereafter, performance indicators are identified, one or more of which indicate data-processing system performance. A diagnostic is then periodically run to detect performance indicators within the data-processing system. A unique audible sound is then generated associated with a particular performance indicator, in response to detecting the status of particular performance indicator via the diagnostic, such that potential data-processing system failures may be recognized by identifying the unique audible sound. The unique audible sound may be continuously generated at varying durations and volumes to indicate the presence of system failures. A trained user, accustomed to particular audible sounds, can identify and diagnose system failures by analyzing unique audible sounds generated by the data-processing system. The frequency and duration of each particular sound may be designated and subsequently altered by the user. The performance indicators may be composed of fault modes, one or more of which may presage data-processing system failures. In addition, the data-processing system itself may be composed of a computer system, such as a personal or mainframe computer.

27 Claims, 4 Drawing Sheets

METHOD AND SYSTEM FOR MONITORING COMPUTER PERFORMANCE UTILIZING SOUND DIAGNOSTICS

BACKGROUND OF THE INVENTION

1. Technical Field

The present invention relates in general to improved techniques for diagnosing and monitoring data-processing system performance. In particular, the present invention relates to system events and audible sounds generated by particular system events. More particularly, the present invention relates to sound synthesis devices. Still more particularly, the present invention relates to methods and systems for diagnosing data-processing system failures utilizing sound synthesis devices.

2. Description of the Related Art

Diagnosing the state of a data-processing system is difficult due to the amount of data that must be gathered, processed, and analyzed. Diagnosing a data-processing system, such as a computer system, requires a great deal of technical skill and experience in order to quickly and efficiently determine the cause of a particular problem. Currently, diagnosing a data-processing system requires the diagnostician or user to physically study interior electronic and other hardware devices, utilizing electrical tools, in combination with software devices, to diagnose specific system components. The diagnostician or user must have a thorough knowledge of both the electrical tools utilized to physically diagnose the data-processing system at hand, along with detailed system operations, such as a working knowledge of cache memory, storage devices, and other data-processing system components.

In essence, the diagnostician or user attempting to determine the cause of a system failure must be an expert in the area of data-processing system repair and configuration, particularly if a problem is to be diagnosed quickly. In the case of a computer system, for example, maintenance of the computer includes activities such as tests, measurements, replacements, and adjustments, which are intended to restore the particular computer or machine at hand to good working order. Typically, by the time even an expert has the tools in place to diagnose the computer system for maintenance and gather potential data related to the particular computer failure at hand, it is too late. The system may be beyond repair at that point.

The ability of a maintenance organization, under given conditions, to provide upon demand, the resources required to maintain and repair a functional unit, such as a computer or group of computers, is directly related to the ease with which a diagnostician or trained user can maintain and repair the functional unit. Presently, in order to maintain and repair computers, diagnosticians follow maintenance analysis procedures contained in a maintenance document that provides a service representative or diagnostician, a step-by-step procedure for tracing a symptom to the cause of failure. The diagnostician or user may also be assisted by a maintenance and operator subsystem that contains a processor and operates independently of the rest of the controller. This subsystem loads and supervises the controller, runs problem determination procedures, and assists in maintaining both hardware and software within the given computer system. In addition, a given computer system may include a maintenance panel, which is a part of a unit of equipment that is utilized for interaction between the unit of equipment and a diagnostician or maintenance engineer. The diagnostician or maintenance engineer thus typically relies on some sort of diagnostic aid, such as a tool, program, or reference manual, to detect and isolate a device or program malfunction or error.

All of these techniques and devices for diagnosing, maintaining and repairing data-processing systems, such as computers, require expertise on the part of the diagnostician or user and involve time consuming tasks, which may in themselves result in damage to the computer when the diagnostician or user physically interacts with the computer under repair or maintenance. The diagnostic function of a piece of equipment, such as a computer, directly contributes to both the longevity and efficiency of that particular piece of equipment. The diagnostic function of a piece of equipment is simply the capability of a functional unit to detect problems and identify the type of error at hand.

From the foregoing, it can be appreciated that maintaining and repairing a data-processing system is a difficult and often time consuming task. Any techniques or tools that would assist a diagnostician or user in increasing maintenance and repair time would be a welcome addition to the tools and techniques presently utilized by diagnosticians and users. In addition, any techniques or tools that would improve the diagnostic function of a data-processing system, such as a computer, would also contribute to the life of the computer itself. The disclosure provided herein addresses and solves these problems by describing a method and system that utilizes sounds and sound synthesis devices to assist diagnosticians and users in maintaining and repairing data-processing systems, in much the same manner that auto mechanics utilize sound to diagnose and repair automobiles. The ability of a trained human ear to identify and diagnose problems based on sound is a technique that diagnosticians and users will both find helpful in the years to come.

SUMMARY OF THE INVENTION

It is an object of the present invention to provide an improved method and system for diagnosing data-processing systems.

It is another object of the present invention to provide an improved method and system for generating audible sounds associated with particular system events.

It is yet another object of the present invention to provide a sound synthesis device for use in diagnosing data-processing systems.

It is still another object of the present invention to provide an improved method and system for diagnosing data-processing system failures utilizing sound synthesis devices.

The above and other objects are achieved as is now described. A method and system are disclosed for diagnosing data-processing system performance. Initially, unique audible sounds are associated with particular performance indicators within the data-processing system. Thereafter, performance indicators are identified, one or more of which indicate data-processing system performance. A diagnostic is then periodically run to detect the status of performance indicators within the data-processing system. A unique audible sound is then generated associated with a particular performance indicator, in response to detecting the particular performance indicator via the diagnostic, such that potential data-processing system failures may be recognized by identifying the unique audible sound. The unique audible sound may be continuously generated at varying durations and volumes to indicate the presence of system failures. A trained user, accustomed to particular audible sounds, can identify and diagnose system failures by analyzing unique audible sounds generated by the data-processing system.

The frequency and duration of each particular sound may be designated and subsequently altered by the user. The performance indicators may be composed of fault modes, one or more of which may presage data-processing system failures. In addition, the data-processing system itself may be composed of a computer system, such as a personal or mainframe computer. Thus, a diagnostician or user listening to the data-processing system would know immediately that a particular resource is being utilized, perhaps excessively, by the frequency of noises emanating from the data-processing system. Furthermore, several noises can be blended to simultaneously diagnose various aspects of the data-processing system. A trained human ear should be able to distinguish noises that do not seem correct, in the same manner that a well trained auto mechanic can identify a problem from among many sounds and noises produced by an automobile.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
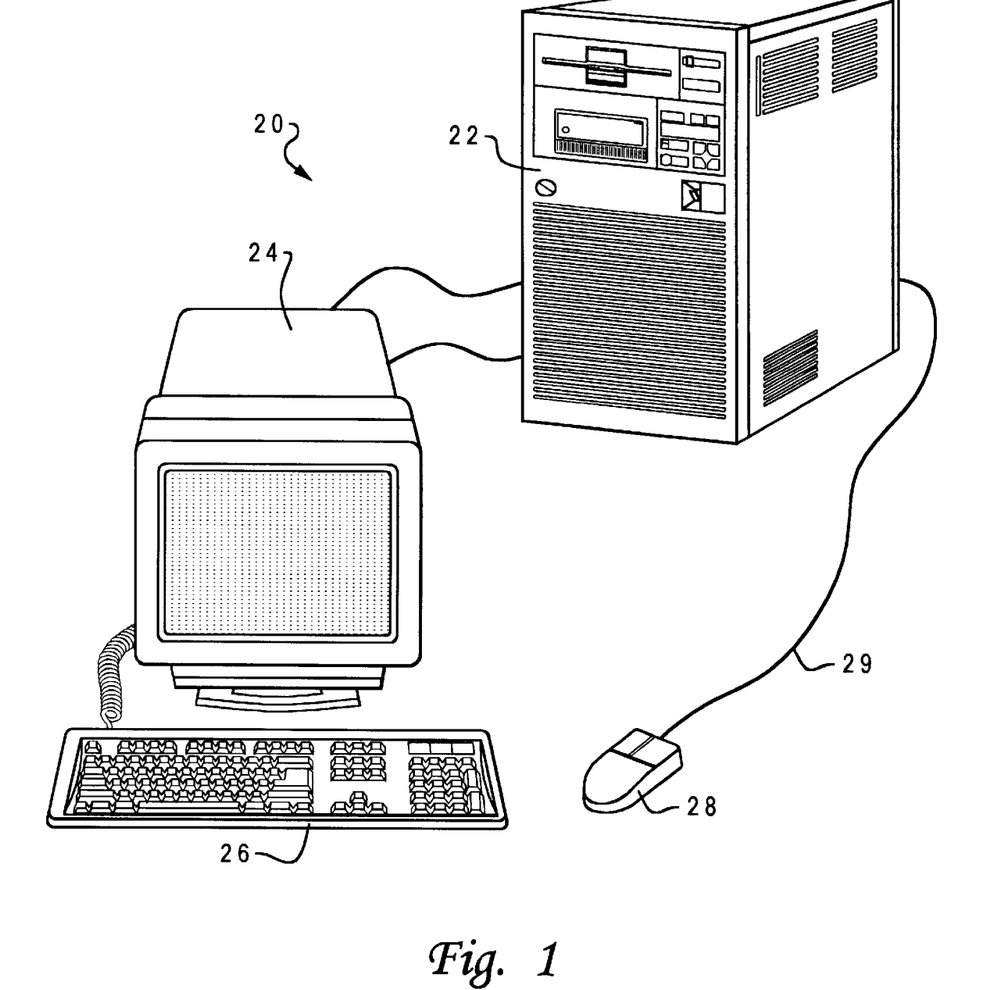
FIG. 1 illustrates a pictorial representation of a data-processing system which may be utilized to implement a preferred embodiment of the present invention.

With reference now to the figures and in particular with reference to FIG. 1, there is depicted a pictorial representation of a data-processing system which may be utilized to implement a preferred embodiment of the present invention. The data-processing system depicted in FIG. 1 is implemented as a computer system 20. Those skilled in the art will appreciate that although a computer system is illustrated in FIG. 1, the method and system described herein may be implemented in accordance with other types of data-processing systems and electronic devices, and that computer system 20 is presented for illustrative purposes only. Computer system 20 depicted in FIG. 1 thus includes a system unit 22, a video display terminal 24, a keyboard 26, and a mouse 28. A cable 29 connects mouse 28 to system unit 22. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Thus, according to a preferred embodiment of the present invention, the user can utilize the mouse to place the graphical representation of a cursor (i.e. mouse pointer) over a desired hypertext link displayed within a computer screen of a video display terminal such as video display terminal 24, and then, utilizing the pointing device, "click" the mouse at the hypertext link to an Internet web page.

Figure 2:
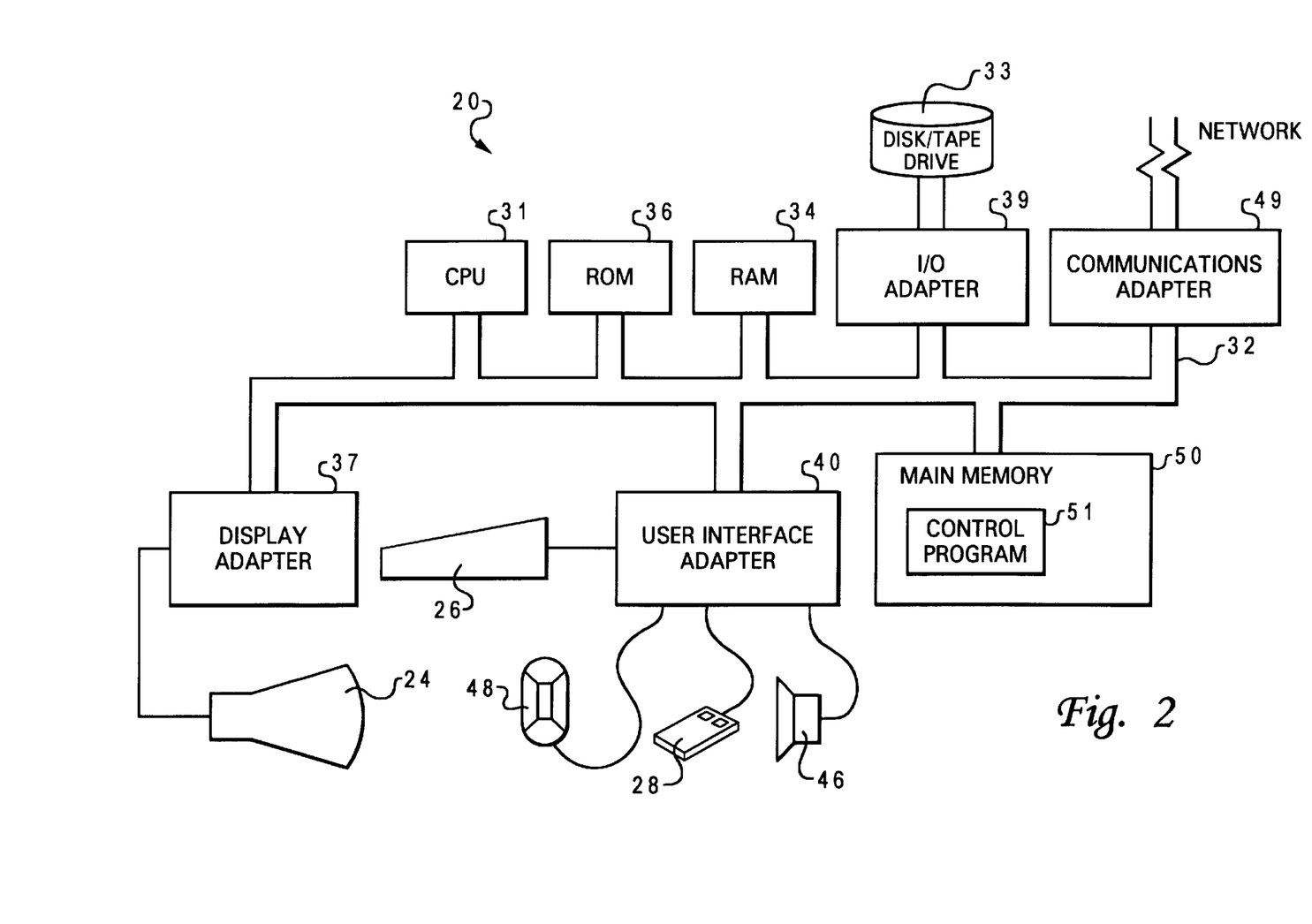
FIG. 2 depicts a representative hardware environment of the computer system illustrated in FIG. 1.

Computer system 20 can be implemented utilizing any suitable computer such as the AS/400 computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Speaker 46 is one type of audio device that may be utilized in association with the method and system provided herein to assist diagnosticians or computer users in analyzing computer system 20 for system failures, errors, and discrepancies. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
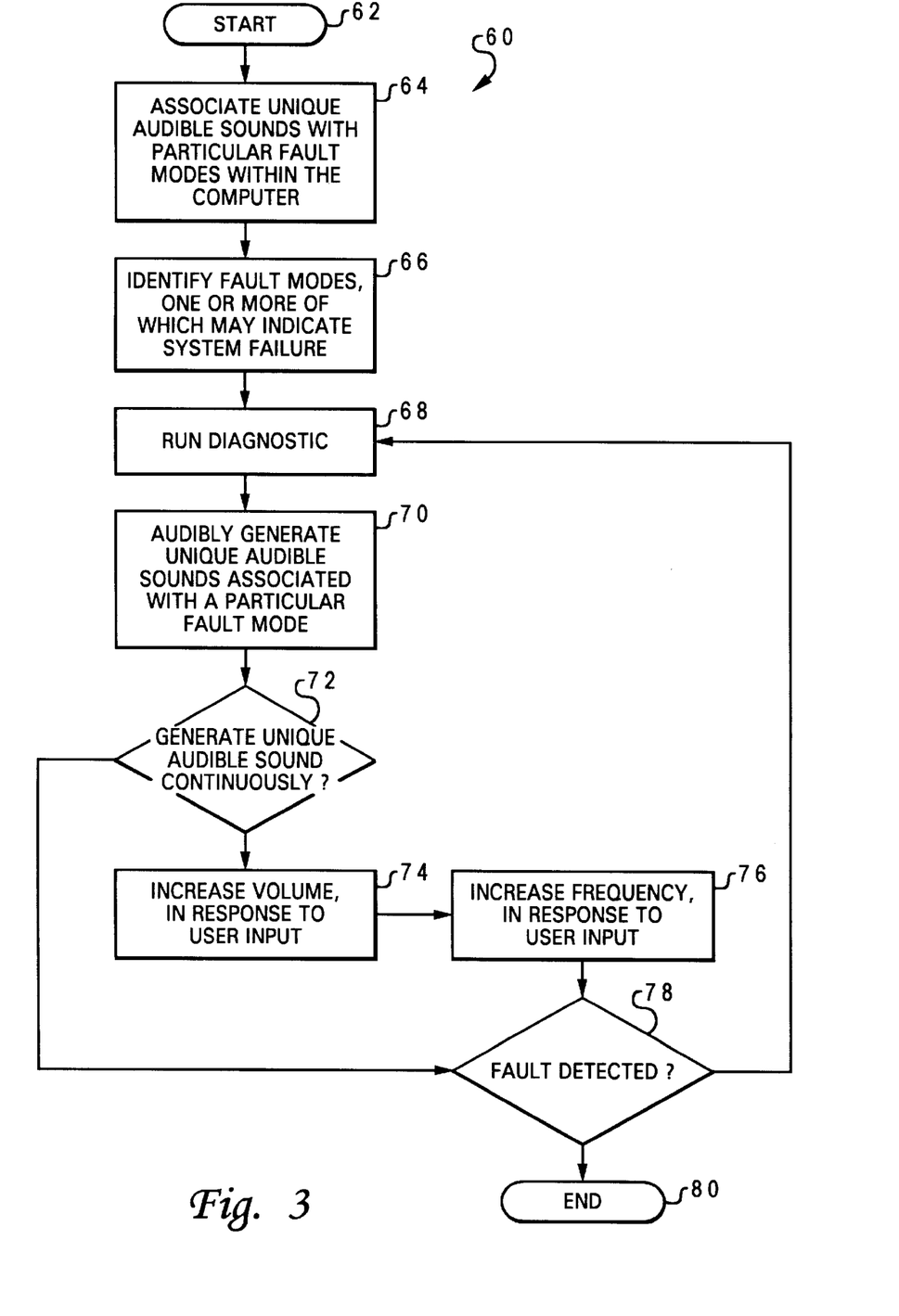
FIG. 3 illustrates a flow diagram that shows steps used to carry out the method and system of the present invention, according to a preferred embodiment of the present invention.

FIG. 3 illustrates a flow diagram 60 that shows steps used to carry out the method and system of the present invention, according to a preferred embodiment of the present invention. It can be appreciated by those skilled in the art that FIG. 3 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 depicted in FIG. 1 and FIG. 2, in processing electrical or other (e.g. mechanical, chemical) physical signals to generate other desired physical signals.

Thus, as indicated at block 62, the process for diagnosing computer system performance is initiated within a data-processing system, such as computer system 20 of FIG. 1 and FIG. 2. As illustrated at block 64, unique audible sounds are associated with particular fault modes within the computer system. The term "fault mode" as utilized herein refers to a type of performance indicator which indicates the performance of the data-processing system under analysis according the method and system described herein. A fault mode is a type of performance indicator which may presage a data-processing system failure. As subsequently described at block 66, one or more fault modes are identified, one or more of which may presage or indicate potential computer system failures. As depicted at block 68, a diagnostic is run which detects fault modes within the computer system. The diagnostic may be composed of a diagnostic subroutine that is designed to detect and locate faults within computer system 20.

Those skilled in the art will appreciate that instead of running a diagnostic subroutine, the user may simply press a button or switch that initiates processing of the audible diagnostics, as subsequently indicated at block 70. If the user is satisfied that everything "sounds good" to his or her trained ear, the user simply turns the button or switch off. However, for purposes of this discussion, it is assumed that a diagnostic subroutine is processed, as described at block 68. As indicated at block 70, a unique audible sound associated with a particular fault mode is audibly generated, in response to detecting the particular fault mode via the diagnostic, such that potential computer system failures may be recognized by identifying the unique audible sound. As illustrated at block 72, a test is performed to determine whether or not to continuously generate the unique audible sound associated with the particular fault mode in order to further assist the user or diagnostician in identifying the particular fault mode associated with that unique audible sound.

If it is determined not to continuously generate the unique audible sound, then as indicated at block 78, another test is performed to determine whether or not the user has detected the fault. If so, the process terminates, as subsequently indicated at block 80. If the fault is not detected, the process, as described beginning at block 68 is repeated and subsequent operations are also repeated until the fault has been detected. As described at 72, however, if it is determined that audible sound is to be generated continuously, then as indicated thereafter at block 74, the volume of the sound can be increased or decreased, in response to user input, to additionally assist the diagnostician or user in identifying the fault associated with that unique audible sound.

In addition, as indicated at block 76, a frequency associated with the unique audible sound can be increased, either in response to continuously audibly generating the unique audible sound associated with the particular fault mode, or in response to user input, depending upon a particular configuration and system implementation of the process indicated herein. Such preferences can be determined in advance by the user or at the factory as default factory settings. Both an increase in frequency and volume can be set prior to running the diagnostic, or altered later, as in the operations depicted at blocks 74 and 76.

Those skilled in the art will appreciate that the operations depicted at blocks 74 and 76 represent merely one example of steps that may be implemented in accordance with a preferred embodiment of the present invention to further refine both method and system features. The unique audible sound can be terminated at any time, in response to a particular user input, such as a particular combination of keystrokes. Finally, as illustrated at block 78, the test is performed to determine whether or not a fault has been detected. If so, then the process terminates, as indicated at block 80. If not, then the operation indicated at block 68 is repeated. When an event occurs, such as page fault or "% CPU" in use, a sound is produced. When a problem occurs with the computer system, the sound diagnostic feature described herein is initiated. A person simply listens closely to the "state" of the machine, and with a trained ear, performs a diagnosis of the computer system based on the sounds produced (i.e., the unique audible sounds described herein).

Figure 4:
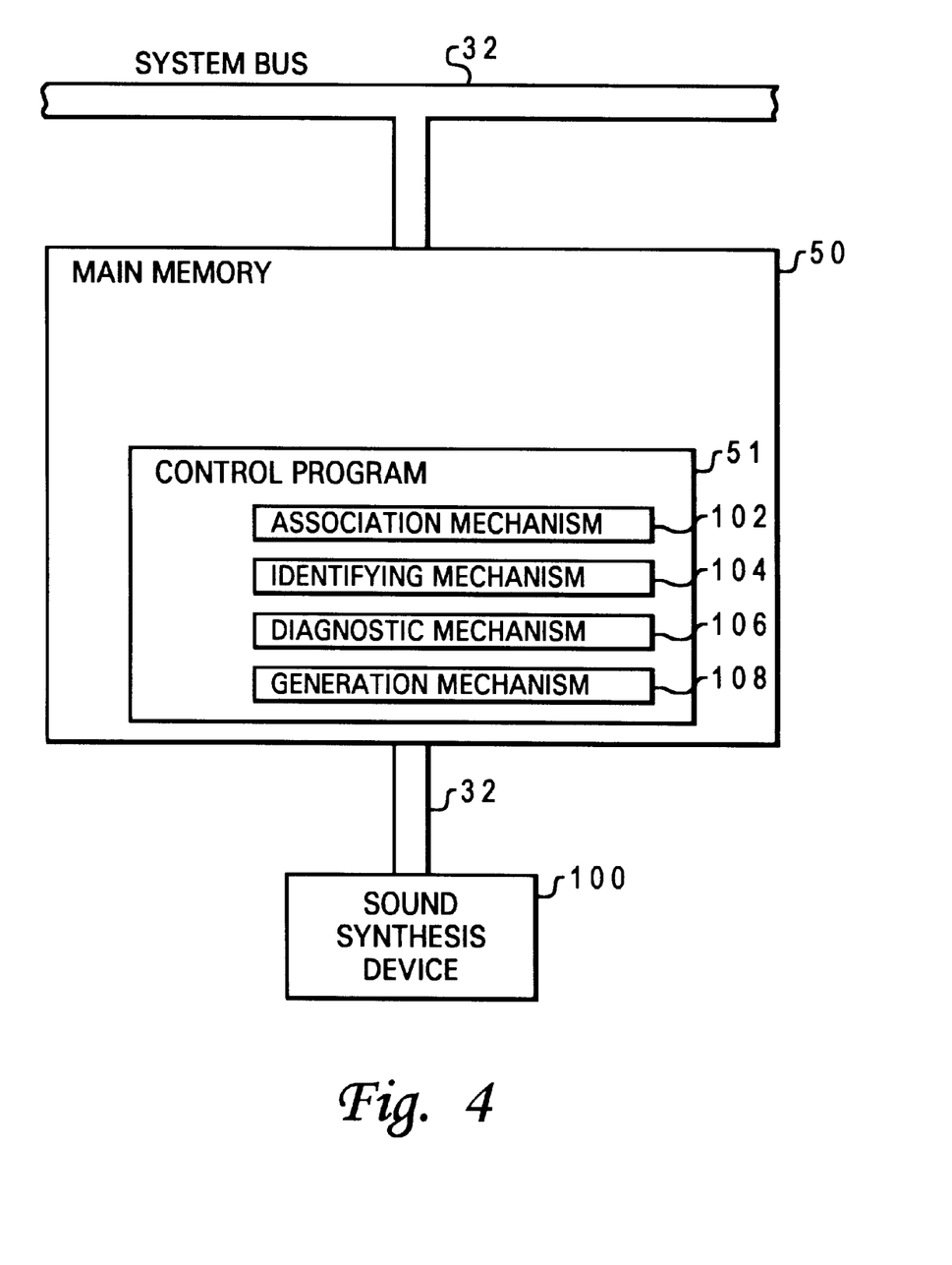
FIG. 4 depicts a block diagram illustrating a program product residing in a computer memory that can be used to carry out the method and system of the present invention, according to a preferred embodiment of the present invention.

FIG. 4 depicts a block diagram illustrating a program product residing in a computer memory that can be used to carry out the method and system of the present invention, according to a preferred embodiment of the present invention. The program product is implemented as a control program 51, which is analogous to control program 51 of FIG. 2. Control program 51 is a routine which can process the operations described herein related to the steps outlined in FIG. 3. On a general level, control program 51 resides in main memory 50 (i.e., analogous to main memory 50 of FIG. 2) and includes an association mechanism 102, an identifying mechanism 104, a diagnostic mechanism 106, and a generation mechanism 108. Association mechanism is a mechanism (i.e., subroutine or algorithm) of control program 51 for associating unique audible sounds with particular performance indicators within the data-processing system under analysis. In the example of FIG. 4, the data-processing system under analysis is computer system 20 of FIG. 1 and FIG. 2. The identifying mechanism 104 is a mechanism of control program 51 for identifying a plurality of performance indicators, one or more of which may indicate data-processing system performance.

Diagnostic mechanism 106 is a mechanism of control program 51 for periodically running a diagnostic to detect performance indicators within the data-processing system. Finally, generation mechanism 108 is a mechanism of control program 51 which audibly generates a unique audible sound associated with a particular performance indicator, in response to detecting the particular performance indicator via the diagnostic, such that potential data-processing system failures may be recognized by identifying the unique audible sound. A sound synthesis device 100 connected to main memory 50 via system bus 32 interacts with control program 51 to generate the unique audible sounds described herein. System bus 32 is analogous to system bus 32 of FIG. 2. The performance indicators described in the text related to FIG. 4 are analogous to the performance indicators described in the text herein related to FIG. 3, and include fault modes, one or more of which may presage data-processing system or computer system failures.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. For example, instead of being utilized to analyze, diagnose and monitor performance indicators and fault modes of a data-processing system such as a computer system, the method and system described herein may be utilized to analyze, diagnose and monitor performance indicators and fault modes of other electronic devices, such as stereo systems, video cassette recorders, portable computers, and so forth. The description as set forth is not intended to be exhaustive or to limit the invention to the precise form disclosed. Many modifications and variations are possible in light of the above teaching without departing from the spirit and scope of the following claims.

What is claimed is:

1. A method in a data-processing system for diagnosing data-processing system performance, said method comprising the steps of:

associating unique audible sounds with particular performance indicators within said data-processing system;

identifying a plurality of performance indicators, one or more of which may indicate data-processing system performance;

periodically running a diagnostic to detect performance indicators within said data-processing system; and audibly generating a unique audible sound associated with a particular performance indicator, in response to detecting said particular performance indicator via said diagnostic, such that potential data-processing system failures may be recognized by identifying said unique audible sound.

2. The method of claim 1 wherein the step of audibly generating a unique audible sound associated with a particular performance indicator, in response to detecting said particular performance indicator via said diagnostic, such that potential data-processing system failures may be recognized by identifying said unique audible sound, further comprises the step of:

continuously audibly generating a unique audible sound associated with a particular performance indicator, in response to detecting said particular performance indicator via said diagnostic, such that potential data-processing system failures may be recognized by identifying said unique audible sound.

3. The method of claim 2 wherein the steps of associating unique audible sounds with particular performance indicators within said data-processing system, further comprises the step of:

associating unique audible sounds with particular performance indicators within said data-processing system, wherein said performance indicators comprise fault modes, one or more of which may presage data-processing system failures.

4. The method of claim 3 wherein the step of associating unique audible sounds with particular performance indicators within said data-processing system, further comprises the step of:

associating unique audible sounds with particular performance indicators within said data-processing system, wherein said data-processing system comprises a computer system.

5. The method of claim 4 wherein the step of identifying a plurality of performance indicators, one or more of which may indicate data-processing system performance, further comprises the step of:

identifying a plurality of fault modes, one or more of which may presage data-processing system failures.

6. The method of claim 5 further comprising the steps of:

increasing a volume associated said unique audible sound, in response to continuously audibly generating said unique audible sound associated with said particular performance mode; and decreasing said volume, in response to user input.

7. The method of claim 5 further comprising the steps of:

increasing a frequency associated with said unique audible sound, in response to continuously audibly generating said unique audible sound associated with said particular performance indicator; and decreasing said frequency, in response to user input.

8. The method of claim 5 further comprising the step of:

terminating said unique audible sound, in response to user input.

9. A system for diagnosing performance within a data-processing, said system comprising:

means for associating unique audible sounds with particular performance indicators within said data-processing system;

means for identifying a plurality of performance indicators, one or more of which may indicate data-processing system performance;

means for periodically running a diagnostic to detect performance indicators within said data-processing system; and means for audibly generating a unique audible sound associated with a particular performance indicator, in response to detecting said particular performance indicator via said diagnostic, such that potential data-processing system failures may be recognized by identifying said unique audible sound.

10. The system of claim 9 wherein said means for audibly generating a unique audible sound associated with a particular performance indicator, in response to detecting said particular performance indicator via said diagnostic, such that potential data-processing system failures may be recognized by identifying said unique audible sound, further comprises:

means for continuously audibly generating a unique audible sound associated with a particular performance indicator, in response to detecting said particular performance indicator via said diagnostic, such that potential data-processing system failures may be recognized by identifying said unique audible sound.

11. The system of claim 10 wherein said performance indicators comprise fault modes, one or more of which may presage data-processing system failures.

12. The system of claim 11 wherein said data-processing system comprises a computer system.

13. The system of claim 12 wherein said plurality of performance indicators comprises a plurality or fault modes.

14. The system of claim 13 further comprising:

means for increasing a volume associated said unique audible sound, in response to continuously audibly generating said unique audible sound associated with said particular performance indicator; and means for decreasing said volume, in response to user input.

15. The system of claim 13 further comprising:

means for increasing a frequency associated with said unique audible sound, in response to continuously audibly generating said unique audible sound associated with said particular performance indicator; and means for decreasing said frequency, in response to user input.

16. The system of claim 13 further comprising:

means for terminating said unique audible sound, in response to user input.

17. A program product residing in data-processing memory in a data-processing for diagnosing data-processing system failures, said program product comprising:

instruction means residing in a data-processing for associating unique audible sounds with particular performance indicators within said data-processing system;

instruction means residing in a data-processing for identifying a plurality of performance indicators, one or more of which may indicate data-processing system performance;

instruction means residing in a data-processing for periodically running a diagnostic to detect performance indicators within said data-processing system; and instruction means residing in a data-processing for audibly generating a unique audible sound associated with a particular performance indicator, in response to detecting said particular performance indicator via said diagnostic, such that potential data-processing system failures may be recognized by identifying said unique audible sound.

18. The program product of claim 17 wherein said instruction means residing in a data-processing for audibly generating a unique audible sound associated with a particular performance indicator, in response to detecting said particular performance indicator via said diagnostic, such that potential data-processing system failures may be recognized by identifying said unique audible sound, further comprises:

instruction means residing in a data-processing for continuously audibly generating a unique audible sound associated with a particular performance indicator, in response to detecting said particular performance indicator via said diagnostic, such that potential data-processing system failures may be recognized by identifying said unique audible sound.

19. The program product of claim 18 wherein said performance indicators comprise fault modes, one or more of which may presage data-processing system failures.

20. The program product of claim 19 wherein said data-processing system comprises a computer system.

21. The program product of claim 20 wherein said plurality of performance indicators comprises a plurality or fault modes.

22. The program product of claim 21 further comprising:
instruction means residing in a data-processing for increasing a volume associated said unique audible sound, in response to continuously audibly generating said unique audible sound associated with said particular performance indicator; and instruction means residing in a data-processing for decreasing said volume, in response to user input.

23. The program product of claim 21 further comprising:
instruction means residing in a data-processing for increasing a frequency associated with said unique audible sound, in response to continuously audibly generating said unique audible sound associated with said particular performance indicator; and instruction means residing in a data-processing for decreasing said frequency, in response to user input.

24. The program product of claim 21 further comprising:
instruction means residing in a data-processing for terminating said unique audible sound, in response to user input.

25. The method of claim 21 wherein each of said instruction means further comprise signal bearing media.

26. The program product of claim 25 wherein said signal bearing media further comprises transmission media.

27. The program product of claim 25 wherein said signal bearing media further comprises recordable media.

* * * * *